(12) United States Patent
Cho et al.

(10) Patent No.: US 7,856,648 B2
(45) Date of Patent: Dec. 21, 2010

(54) METHOD FOR PROCESSING VOD DATA IN MOBILE STATION

(75) Inventors: Hyun-Wook Cho, Daegu (KR); Dae-Gyue Park, Daegu (KR); Jae-Gon Son, Daegu (KR); Kang-Wook Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1374 days.

(21) Appl. No.: 11/034,971

(22) Filed: Jan. 14, 2005

(65) Prior Publication Data

US 2005/0160466 A1 Jul. 21, 2005

(30) Foreign Application Priority Data

Jan. 17, 2004 (KR) .................. 10-2004-0003599

(51) Int. Cl.
*H04B 7/216* (2006.01)
(52) U.S. Cl. .................. 725/62; 725/89; 725/90
(58) Field of Classification Search .............. 725/62, 725/86–104
See application file for complete search history.

(56) References Cited

U.S. PATENT DOCUMENTS

| 6,745,047 B1 * | 6/2004 | Karstens et al. ........ 455/556.1 |
| 2003/0103518 A1 * | 6/2003 | Han ........................ 370/441 |

FOREIGN PATENT DOCUMENTS

| JP | 05-067007 | 3/1993 |
| JP | 05-276222 | 10/1993 |
| JP | 06-309251 | 4/1994 |
| JP | 08181734 A * | 7/1996 |
| JP | 2000-183968 | 6/2000 |
| JP | 2000-235536 | 8/2000 |
| JP | 2001-0339462 | 12/2001 |
| JP | 2003-308262 | 10/2003 |
| WO | WO 01/76279 | 10/2001 |
| WO | WO 02/23745 | 3/2002 |

OTHER PUBLICATIONS

Andrew Sun, Using and Managing PPP, Mar. 1999, O'Reilly & Associates, Inc, First Edition, pp. 6-7 and 54-55.*
Sun, Andrew; Using and Managing PPP; 1999; O'Reilly and Associates.*

* cited by examiner

*Primary Examiner*—Andrew Y Koenig
*Assistant Examiner*—Carmine Malangone
(74) *Attorney, Agent, or Firm*—Roylance, Abrams, Berdo & Goodman, L.L.P.

(57) ABSTRACT

Disclosed is a method for processing VOD data in a mobile station including a multimedia processor and an MSM for controlling the mobile station. The method comprises the steps of negotiating PPP option information by performing PPP negotiation for making communication with a server when the mobile station accesses to a WAP through the MSM; transmitting the PPP option information negotiated through the MSM to the multimedia processor; setting a VOD data route using the transmitted PPP option information as PPP information of the multimedia processor; processing VOD data, which are received in the MSM according to the VOD data route, up to an RLP layer of the VOD data, and then transmitting the VOD data to the multimedia processor; and processing the VOD data, which are transmitted to the multimedia processor, from a PPP layer which is a lowest layer in the multimedia processor.

10 Claims, 9 Drawing Sheets

| TASK | MSM time(ms) | No taskswitching | Priority |
|---|---|---|---|
| UI | 71 | 330 | 100 |
| CM | 5 | 0 | 150 |
| sleep | 56 | 345 | 50 |
| DS | 2 | 0 | 70 |
| PS | 2 | 0 | 60 |
| hdrtx | 7 | 5 | 690 |
| hdrrx | 9 | 10 | 590 |
| hdrsrch | 92 | 95 | 490 |
| hdrmc | 23 | 45 | 390 |
| tx | 2 | 0 | 700 |
| rx | 2 | 0 | 600 |
| MC | 2 | 0 | 400 |
| dog | 20 | 0 | 1000 |
| nv | 10 | 5 | 81 |

METHOD FOR PROCESSING VOD DATA IN MOBILE STATION

PRIORITY

This application claims the benefit under 35 U.S.C. §119(a) of an application entitled "Method for Processing VOD Data in Mobile station" filed in the Korean Intellectual Property Office on Jan. 17, 2004 and assigned Serial No. 2004-3599, the entire contents of which are incorporated herein by reference.

BACKGROUND OF THE INVENTION

1. Field of the Invention

The present invention relates to a mobile station, and more particularly to a method for processing Video On Demand (VOD) data in a mobile station, which can rapidly process VOD contents in the mobile station connected to a VOD service provider.

2. Description of the Related Art

Recently, as communication technologies have developed, mobile stations have a plurality of supplementary functions as well as the normal communication function. Such supplementary functions include a camera function, a camcorder function, and a multimedia function. Herein, the multimedia function is to reproduce data of various media including voice, text, still pictures, moving pictures, and the like, so users of the mobile stations equipped with multimedia functions can receive VOD services for the various multimedia contents, that is, video data (e.g., 'VOD data') such as movies, music videos, and the like, from multimedia providers through a wireless network.

The VOD service provides multimedia contents in a streaming format (in other words, in real-time). The mobile station contains a separate multimedia chip (such as a multimedia processor) besides a control chip (a mobile station modem (MSM), for example) for performing the general control functions of the mobile station so as to more stably process the VOD data.

Figure 1A:
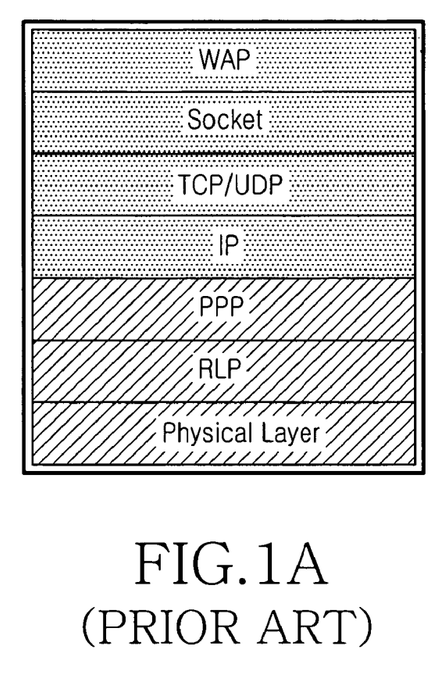
FIGS. 1A and 1B are views representing VOD protocol stacks of an MSM and a multimedia processor for VOD service in a conventional mobile station, respectively.
Figure 1B:
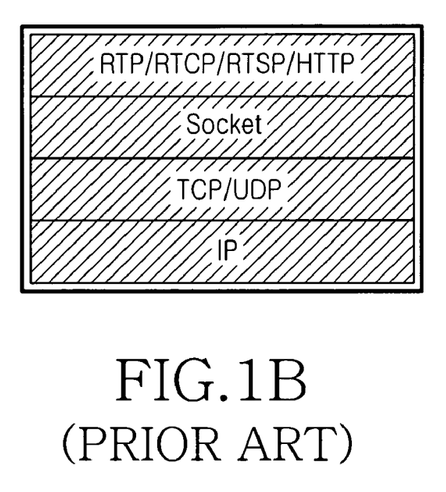

FIGS. 1A and 1B are views representing VOD protocol stacks of an MSM and a multimedia processor for VOD service in a conventional mobile station, respectively.

The protocol stack for the MSM shown in FIG. 1A includes a physical layer, which is the lowest layer, a Radio Link Protocol (RLP) layer, a Point to Point Protocol (PPP) layer, an Internet Protocol (IP) layer, a Transmission control Protocol/User Datagram Protocol (TCP/UDP) layer, a Socket layer, and a Wireless Application Protocol (WAP) layer, which is the highest layer in the sequence.

That is, such a MSM is connected to the WAP-based Internet by negotiation of the PPP layer.

Also, the protocol stack for the multimedia processor shown in FIG. 1B includes an IP layer, a TCP/UDP layer, a Socket layer, and a real-time transfer protocol/real-time conferencing protocol/real-time streaming protocol/hypertext transfer protocol (RTP/RTCP/RTSP/HTTP) layer.

Such a multimedia processor receives VOD data, which has been received by the MSM through the WAP-based Internet and has been decapsulated from the lowest layer to the PPP layer of VOD data by the MSM, and processes the VOD by decapsulating the VOD data from the IP layer to the RTP/RTCP/RTSP/HTTP layer. Also, data is transmitted to a VOD server, the multimedia processor transmits transmission data to the MSM in a sequence opposite to the received VOD data processing sequence.

Figure 2:
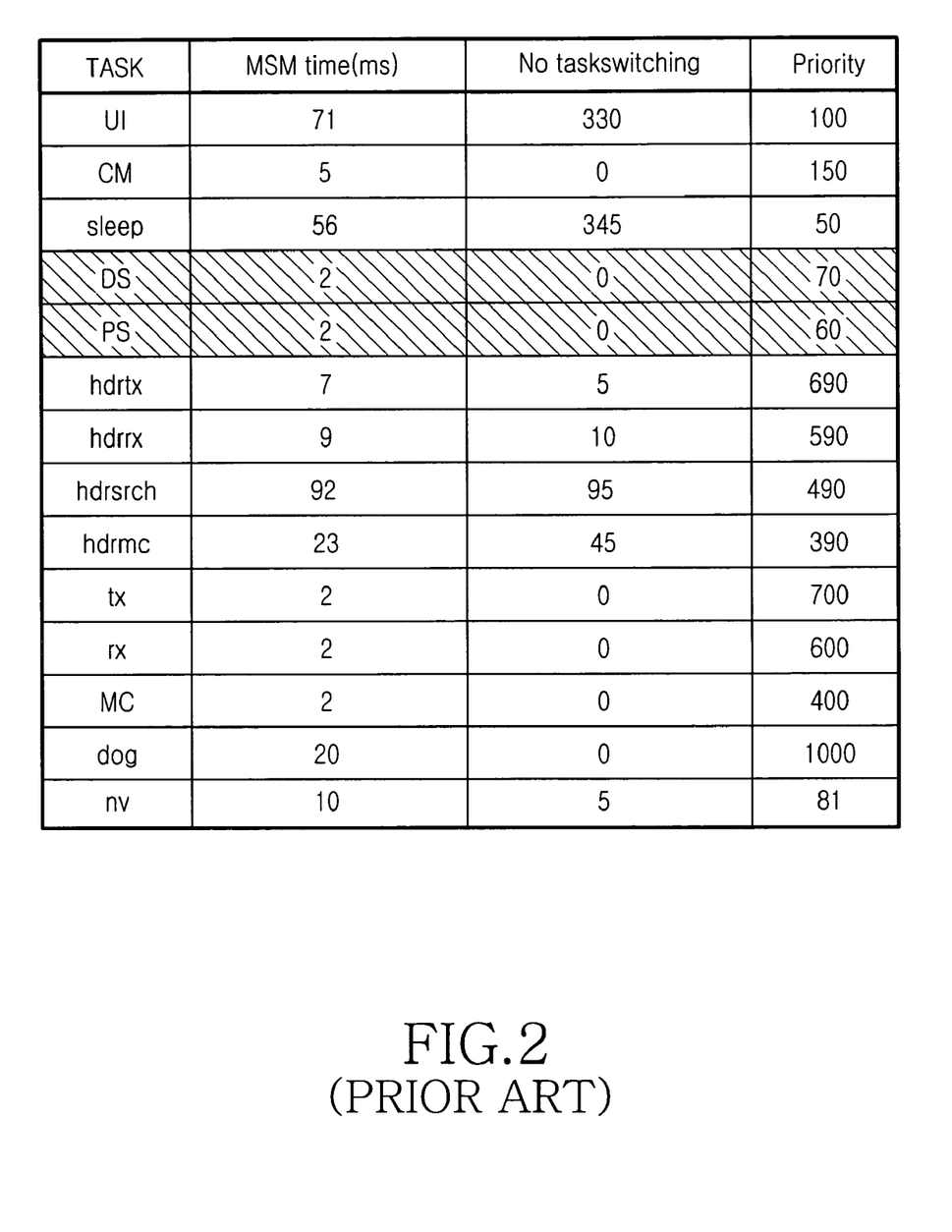
FIG. 2 is view representing MSM occupancy rates and priorities according to tasks in a conventional mobile station.

In this case, the MSM processes VOD data according to a priority as shown in FIG. 2. In FIG. 2, 'TASK' represents a task performed for VOD service by the MSM, 'CPU time (ms)' represents an MSM occupancy rate per minute, 'NO taskswitching' represents the number of times by which a relevant TASK is deprived of an occupation opportunity by other TASKs during an occupation time period and 'Priority' represents the priority of a relevant TASK. Herein, a larger priority number indicates a higher priority.

Referring to FIG. 2, it should be understood that the higher the priority is, the higher the MSM occupation rate becomes, resulting in a smaller number of switching times between TASKs.

According to a VOD service method of a conventional mobile station having the above-mentioned construction, after a mobile station accesses the VOD server through the WAP-based Internet, the MSM processes multimedia data up to the PPP layer, and then the multimedia processor processes the multimedia data from the IP layer to the RTP/RTCP/RTSP/HTTP layer. In this way, the conventional mobile station can process VOD data, which has been received from the VOD server through a wireless network, through the multimedia processor.

However, as shown in FIG. 2, the conventional mobile station must process data service (DS) and data protocol service (PS) having a considerably low priority such as '70' and '60' at the MSM thereof, so an overload is applied thereto, therefore, it is difficult to assure the maximum processing speed.

SUMMARY OF THE INVENTION

Accordingly, the present invention has been made to solve the above-mentioned problems occurring in the prior art, and an object of the present invention is to provide a method for processing VOD data in a mobile station which can rapidly process VOD data by changing a protocol stack of a multimedia processor, which processes VOD data through protocols negotiated when the mobile station is connected to a WAP-based Internet through an MSM.

To accomplish this object, in accordance with one aspect of the present invention, there is provided a method for processing Video On Demand (VOD) data in a mobile station including a multimedia processor for processing multimedia data and an Mobile Station Modem (MSM) for controlling the mobile station, the method comprising the steps of negotiating PPP option information by performing Point to Point Protocol (PPP) negotiation for making communication with a server when the mobile station accesses to a Wireless Application Protocol (WAP) through the MSM; transmitting the PPP option information negotiated through the MSM to the multimedia processor; setting a VOD data route by using the transmitted PPP option information as PPP information of the multimedia processor; processing VOD data, which is received by the MSM according to the VOD data route, up to an RLP layer of the VOD data, and then transmitting the VOD data to the multimedia processor; and processing the VOD data, which is transmitted to the multimedia processor, from a PPP layer, which is a lowest layer in the multimedia processor.

BRIEF DESCRIPTION OF THE DRAWINGS

The above and other objects, features and advantages of embodiments of the present invention will be more apparent from the following detailed description taken in conjunction with the accompanying drawings, in which.

DETAILED DESCRIPTION OF THE PREFERRED EMBODIMENTS

Hereinafter, a method for processing VOD data in a mobile station according to an embodiment of the present invention will be described with reference to the accompanying drawings. In the following description of an embodiment of the present invention, a detailed description of known functions and configurations incorporated herein will be omitted for the sake of clarity.

Figure 3:
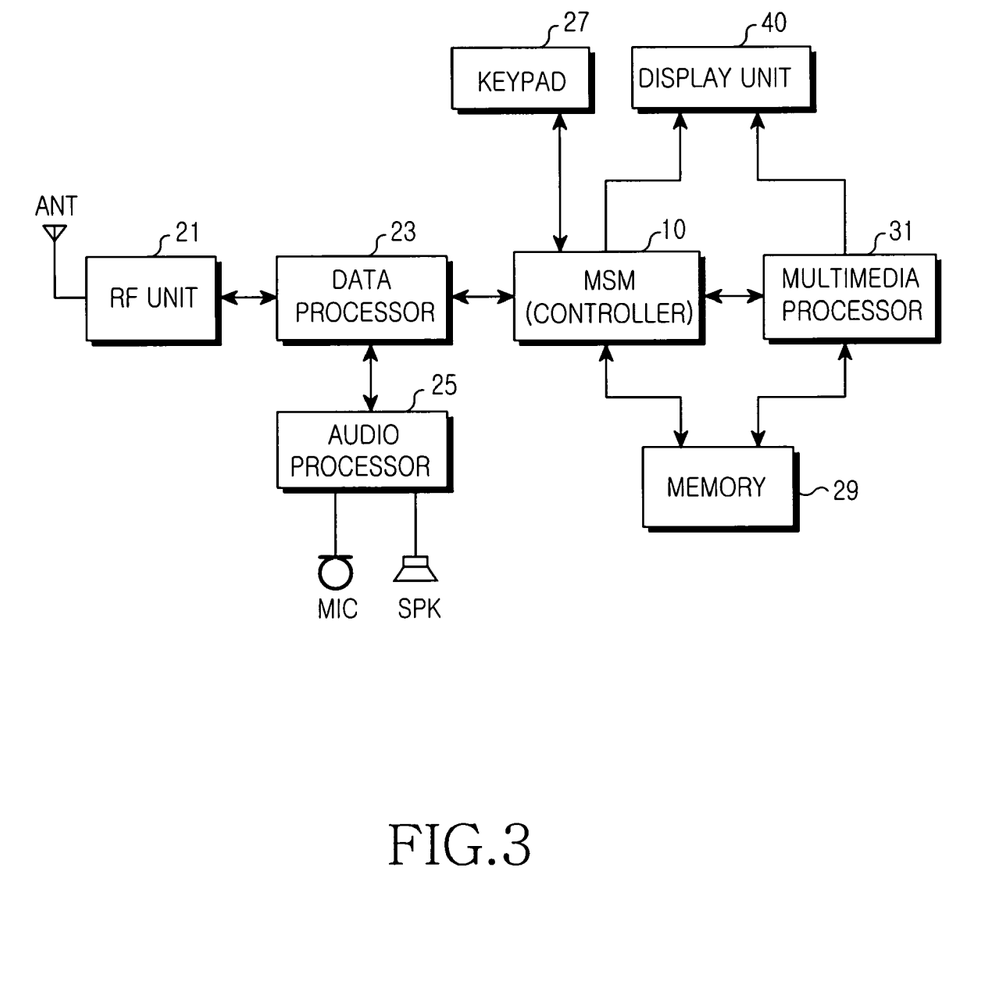
FIG. 3 is a block diagram illustrating a construction of a mobile station according to an embodiment of the present invention.

FIG. 3 is a block diagram illustrating a construction of a mobile station according to an embodiment of the present invention.

A Radio Frequency (RF) unit 21 performs the transmission and reception functions of the mobile station. The RF unit 21 comprises an RF transmitter and an RF receiver. The RF transmitter up-converts and amplifies the frequency of a signal to be transmitted and the RF receiver low-noise amplifies a received signal and down-converts the frequency of the received signal.

A data processor 23 includes a transmitter for encoding and modulating the signal to be transmitted and a receiver for demodulating and decoding the received signal. That is, the data processor 23 may include a modulator and demodulater (MODEM) and a coder/decoder (CODEC).

An audio processor 25 reproduces a received audio signal output from the data processor 23 and transfers a transmission audio signal, which is output from a microphone; to the data processor 23. Also, the audio processor 25 outputs a voice signal, which is transferred through VOD data in real-time according to an embodiment of the present invention, to a speaker.

A keypad 27 includes keys for inputting number and character information and function keys for setting various functions. The keypad 27 may include a VOD access key, a menu key, direction keys, and a confirmation key according to an embodiment of the present invention.

A memory 29 may comprise a program memory and a data memory. The program memory stores programs for controlling a normal operation of the mobile station and a program for processing VOD data according to an embodiment of the present invention.

A multimedia processor 31 processes VOD data received through a wireless network while VOD service is executed. The multimedia processor 31 according to the an embodiment of the present invention receives PPP option information, negotiated, while the WAP access is performed, by an MSM 10 and then uses the received PPP option information as PPP information of the multimedia processor 31. In addition, while using the PPP option information as PPP information of the multimedia processor 31, the multimedia processor 31 forms upper layers (IP, TCP/UDP, Socket, RTP/RTCP/RTSP/HTTP) for processing VOD data, which are processed by an Radio Link Protocol (RLP) of the MSM 10 and then output from the MSM 10, and processes the VOD data through a decapsulation process of the VOD data according to each layer. In addition, the multimedia processor 31 encapsulates transmission data, which corresponds to the VOD data received from the MSM 10, from the highest protocol layer to the lowest protocol layer to transmit the transmission data to the MSM 10.

The MSM 10 performs the function of controlling the general operation of the mobile station. In addition, when a menu item for VOD server access is selected by the keypad 27, the MSM 10 recognizes it and transmits the PPP option information set by performing the PPP negotiation while WAP access is performed and information about upper protocols (IP, TCP/UDP, and Socket) formed through the WAP access to the multimedia processor 31. Also, the MSM 10 receives the transmission data, which is output from the multimedia processor 31 according to the VOD data received by the multimedia processor 31, and transmits the received transmission data to a VOD server.

A display unit 40 displays messages generated during a program operation under the control of the MSM 10. In addition, the display unit 40 displays user data output from the MSM 10. In addition, the display unit 40 displays VOD data processed by and output from the multimedia processor 31 according to an embodiment of the present invention. Herein, the display unit 40 may include an LCD. In this case, the display unit 40 may also include an LCD controller, a memory for storing image data, and an LCD element. When the LCD has a touch screen structure, the keypad 27 and the LCD may act as an input section.

The operation of the mobile station will now be described with reference to FIG. 3. In the case of an outgoing call mode, when a user selects an outgoing call mode after performing a dialing operation using the keypad 27, the MSM 10 recognizes it, and controls that received dial information to be output after the received dial information is processed by the data processor 23 and converted into an RF signal by the RF unit 21. Thereafter, when a response signal is generated from a called subscriber, the mobile station recognizes the response signal by the RF unit 21 and the data processor 23. Then, a voice communication channel is formed by the audio processor 25, so that it becomes possible for the user to communicate with other subscribers. Also, in the case of an incoming call, the MSM 10 recognizes the selection of the incoming call mode by the data processor 23 and a ring signal is generated by the audio processor 25. Thereafter, when the user selects a response to the ring signal, the MSM 10 recognizes it, and then a voice communication channel is formed by the audio processor 25, so that it becomes possible for the user to communicate with the calling subscriber. While voice communication has been described as an example in the outgoing call mode and incoming call mode, it will be understood that the embodiment may be applied to data communication for the communication of packet data and image data besides the voice communication. Also, during a waiting mode or during a character communication mode, the MSM 10 displays character data processed by the data processor 23 on the display unit 40.

A WAP access and VOD data processing procedure of the mobile station described above will now be described. A VOD access key is pressed in the keypad 27, or a menu item corresponding to the VOD access key from among menu items displayed after the menu key has been pressed is selected by the confirmation key. Then, the MSM 10 recognizes key data generated by the VOD access key or the confirmation key and attempts WAP access. In this case, in order for the MSM 10 to access to a WAP-based Internet and to be provided with VOD service, a negotiation process for a data transfer protocol between the VOD server and a base station is first performed.

The negotiation process for allowing a user to use the VOD service through the WAP will now be described in detail with reference to the accompanying drawings.

Figure 4A:
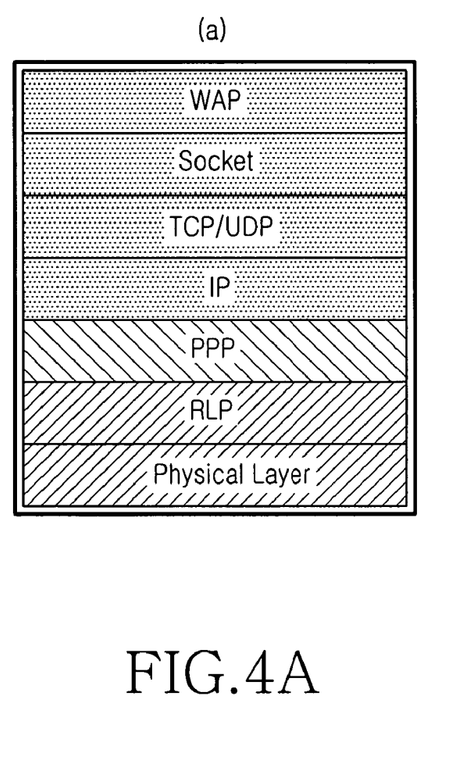
FIGS. 4A and 4B are exemplary views representing VOD protocol stacks of a multimedia processor and an MSM for VOD service which are shown in FIG. 3.
Figure 4B:
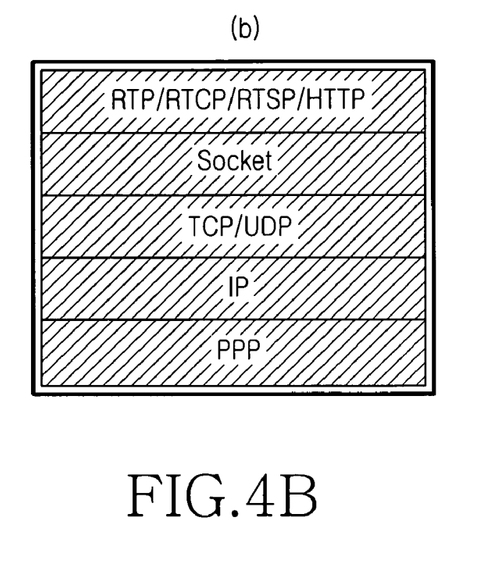

FIGS. 4A and 4B are exemplary views representing VOD protocol stacks of the multimedia processor and the MSM for VOD service which are shown in FIG. 3.

FIG. 4A shows a protocol stack of the MSM 10, which has the same construction as that of the protocol stack for the conventional MSM. That is, the protocol stack for the MSM 10 shown in FIG. 4A includes a physical layer, which is the lowest layer, an RLP layer, a layer, an IP layer, a TCP/UDP layer, a Socket layer, and a WAP layer, which is the highest layer, in sequence.

That is, the MSM 10 causes received data to undergo a decapsulation procedure according to each layer and transmits the received data to an application program through the WAP layer which is the highest layer.

FIG. 4B shows a protocol stack of the multimedia processor 31, which includes a PPP layer as the lowest layer, differently from the protocol stack of the conventional multimedia processor including layers from a RTP/RTCP/RTSP/HTTP layer to an IP layer, which is the lowest layer.

That is, the protocol stack of the multimedia processor 31 includes the PPP layer as the lowest layer and includes an IP layer, a TCP/UDP layer, a Socket layer, and an RTP/RTCP/RTSP/HTTP layer sequentially-stacked on the PPP layer.

By such a protocol stack, the MSM 10 transmits option information of the PPP layer, which is negotiated when the MSM 10 accesses to the WAP-based Internet, to the multimedia processor 31. Then, the multimedia processor 31 receives the option information of the PPP layer and uses the received option information as PPP information of the multimedia processor 31.

Therefore, VOD data received through the MSM 10 are processed only up to the RLP layer by the MSM 10, and VOD data from the PPP layer to the highest layer, which are upper layers of the RLP layer, are processed by the multimedia processor 31.

Figure 5:
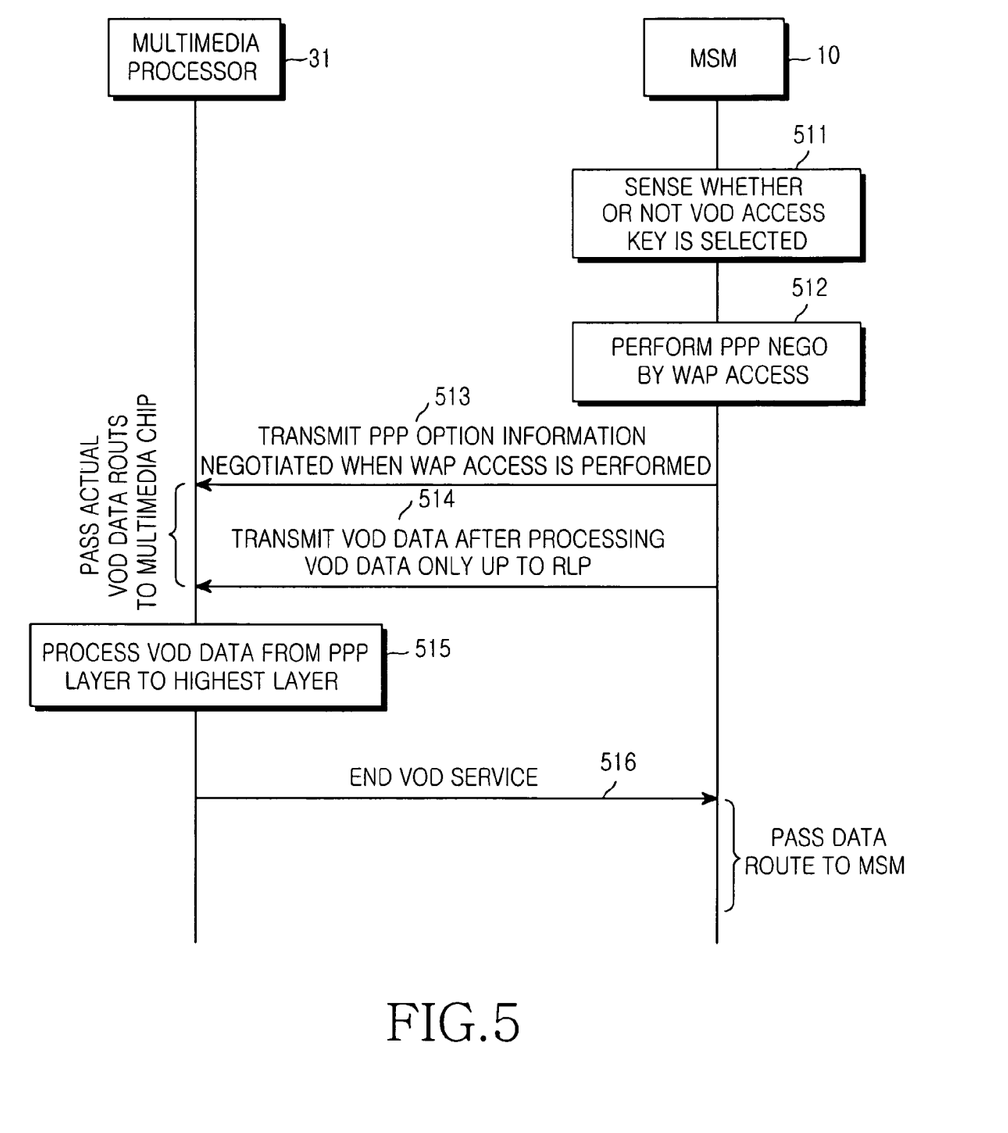
FIG. 5 is a flow diagram illustrating a method of processing VOD data in the mobile station according to an embodiment of the present invention.

FIG. 5 is a flow diagram illustrating a method of processing VOD data in the mobile station according to an embodiment of the present invention.

In a waiting mode, the MSM 10 senses whether or not either a VOD access key or a menu item corresponding to the VOD access key is selected by the keypad 27 in step 511.

As a result of the sensing, when the VOD access key or a menu item corresponding to the VOD access key is selected by the keypad 27, the MSM 10 recognizes it and attempts WAP access in step 512. In this case, the MSM 10 performs negotiation with a wireless Internet in order to receive VOD data through the WAP-based Internet from a VOD server in the wireless network.

A PPP negotiation procedure of the MSM 10 for WAP access will now be described with reference to the accompanying drawings.

Figure 6:
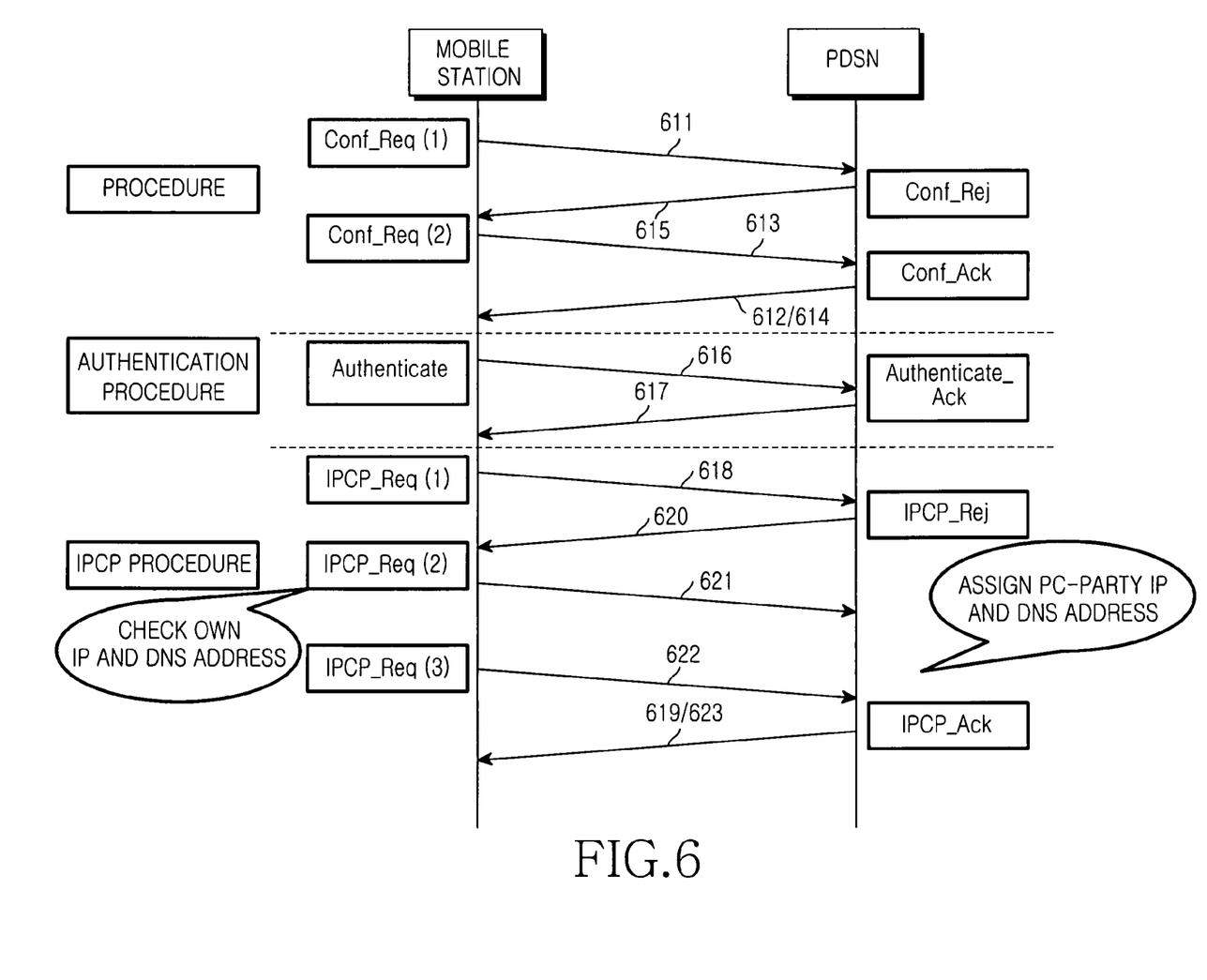
FIG. 6 is a flow diagram schematically illustrating a PPP negotiation procedure between a mobile station and a wireless network according to an embodiment of the present invention.

FIG. 6 is a flow diagram schematically illustrating an exemplary PPP negotiation procedure between a mobile station and a wireless network according to an embodiment of the present invention. In the following description of FIG. 6, the mobile station represents the MSM 10.

An LCP negotiation procedure is shown in steps 611 to 616, an authentication (PAP/CHAP) procedure is shown in steps 617 and 618, and an IPCP negotiation procedure is shown in steps 619 to 623.

First, in step 611, the mobile station transmits 'Conf_Req (1)' for LCP negotiation to a PDSN (Packet Data Serving Node, used for wireless Internet access). Herein, number '1' of the 'Conf_Req(1)' expresses ID information representing a serial number for transmission data.

Figure 7:
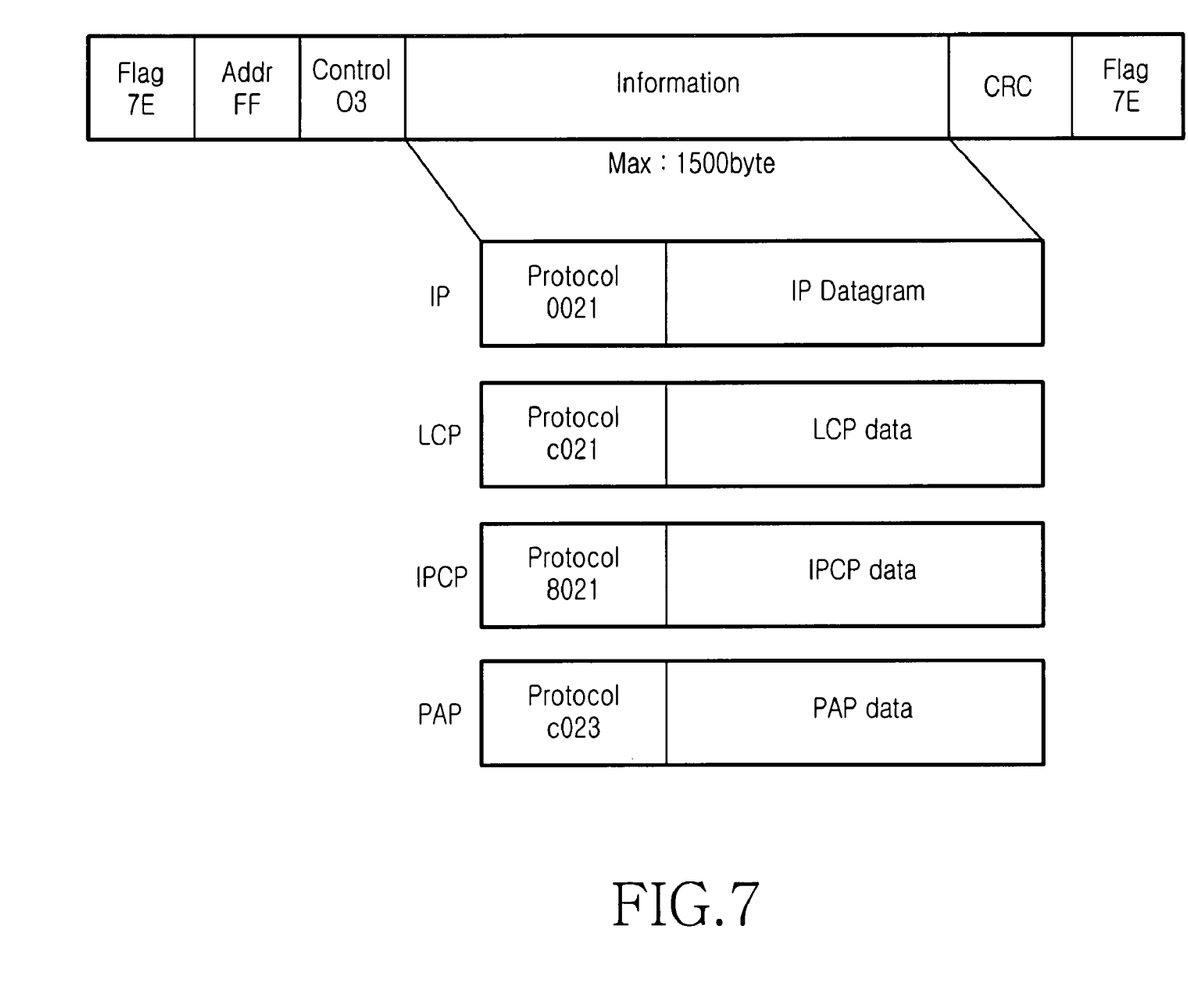
FIG. 7 is a view representing the construction of an LCP frame used in an LCP negotiation procedure shown in FIG. 6.

The frame for the 'Conf_Req(1)' includes, as shown in FIG. 7, a first flag field, an address field, a control field, an information field, a CRC field and a second flag field, and the frame for the 'Conf_Req(1)' is preferably constructed with a maximum of 1500 bytes. Each of the fields has the same function as the fields of a normal frame, a detailed description of which will be omitted. In the PPP data frame for the PPP negotiation, the value of the first flag field is '7E', the value of the address is 'FF', and the value of the control field is '03'. The information field preferably includes one of multiple protocols and one of multiple data (IP/LCP/IPCP/PAP data) information. Therefore, the IP/LCP/IPCP/PAP data are distinguished from each other according to the protocols.

As shown in FIG. 7, an IP protocol is 'C0021' when the frame is an IP frame, an LCP protocol is 'C021' when the frame is an LCP frame, an IPCP protocol is '8021' when the frame is an IPCP frame, and a PAP protocol is 'C023' when the frame is a PAP protocol. In addition, in each portion following the respective protocols, data of a relevant protocol are included. Therefore, by the protocol information, it is possible to recognize any data of the IP/LCP/IPCP/PAP data to be included. Frames of the PAP/IPCP will be described in detail below along with the description of IPCP and PAP negotiation procedures. Herein, it should be noted that the data frames (LCP, PAP/CHAP, and IPCP) for PPP negotiation and the PPP data frame for VOD data have an equal frame structure except for an information field having a different protocol and data of a relevant protocol, as described with reference to FIG. 7.

Figure 8:
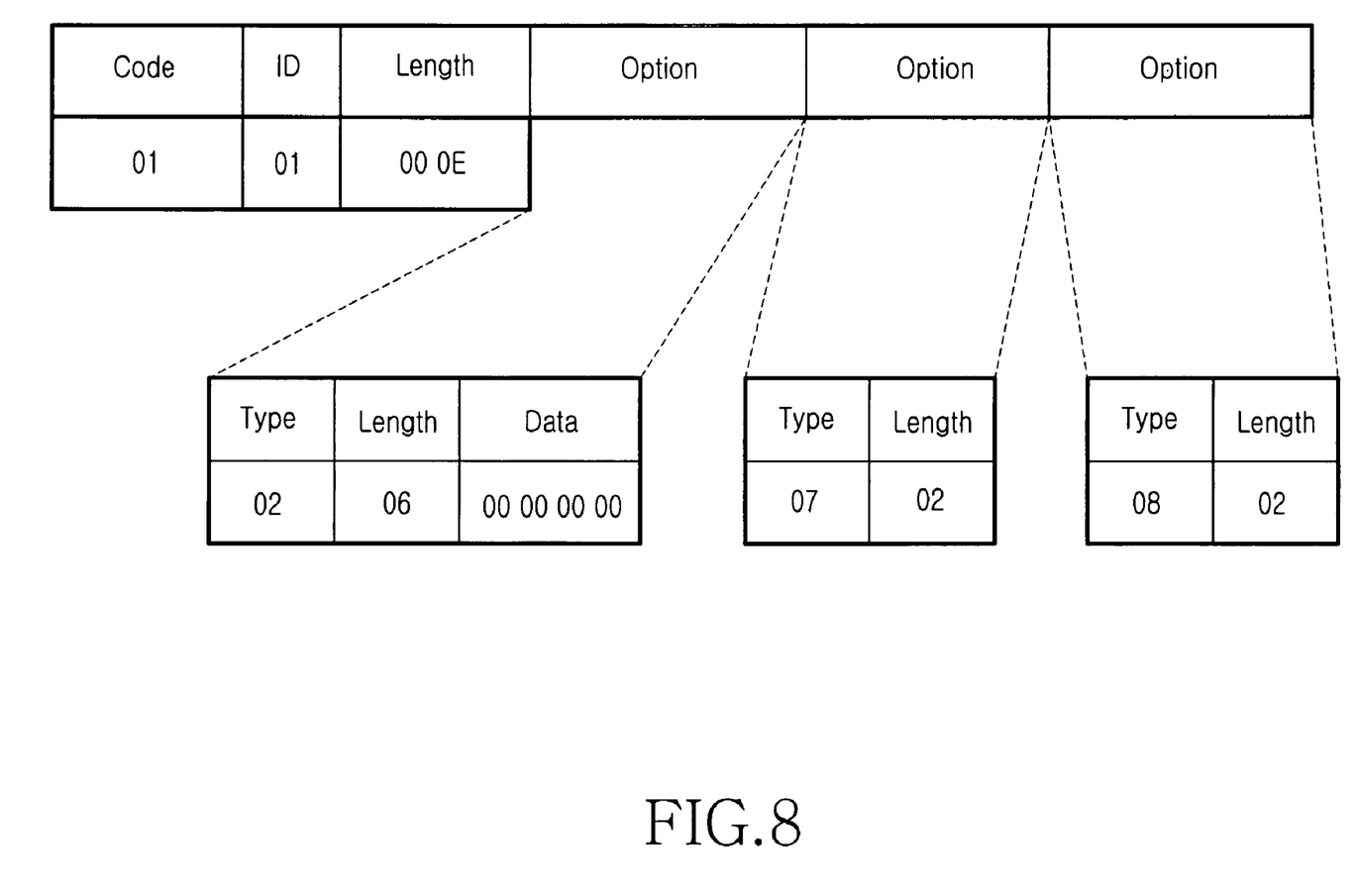
FIG. 8 is a view representing a detailed construction of the LCP frame shown in FIG. 7.

In the information field shown in FIG. 7, data of a relevant protocol except for information about a protocol are subdivided as shown in FIG. 8. That is, the data of a relevant protocol includes 8-bit code information, identifier (ID) information, 16-bit length information representing option information (Type+Length+Data or Type+Length) and actual data of a relevant protocol (such as option information) having the remaining bits. FIG. 8 is an exemplary view representing three LCP negotiation option information, in which code information is '1' and Type information is '2', '7', and '8'.

Protocol data subdivided in FIG. 8 will now be described in more detail.

First, each number of the code information has a meaning as shown in Table 1 below.

TABLE 1

| Code number | Data of LCP frame corresponding to codes |
| --- | --- |
| 1 | Configure-Request |
| 2 | Configure-Ack |
| 3 | Configure-Nak |
| 4 | Configure-Reject |
| 5 | Terminate-Request |
| 6 | Terminate-Ack |
| 7 | Code-Reject |
| 8 | Protocol-Reject |
| 9 | Echo-Request |
| 10 | Echo-Reply |
| 11 | Discard-Request |

Hereinafter, code numbers of '1', '2', '3', and '4' from among code numbers shown in Table 1 will be briefly described. Code number '1' indicates data transmitted from a mobile station to a PDSN or vice versa in an LCP negotiation procedure of a PPP negotiation procedure, and means a signal requesting LCP negotiation. The code number '1' is a code number that is included in each of 'Conf_Req (1)', 'Conf_Rej', and 'Conf_Req (2) signals shown in FIG. 6.

Code number '2' represents a signal for notifying that the mobile station or the PDSN (a receiving party, for example) normally receives data transmitted from the PDSN or the mobile station (such as a transmitting party) in the LCP negotiation procedure and acknowledges the received data. The code number '2' is a code number which is included in a 'Conf_Ack' signal shown in FIG. 6.

Code number '3' represents a signal for ordering that the transmitting party again requests the LCP negotiation either when the receiving party does not normally receive data transmitted from the transmitting party or when the receiving party rejects the 'Configure Request' of code number '1' in the LCP negotiation procedure. The code number '3' is a code number which is opposite to code number '2'.

Code number '4' represents a signal for indicating that the mobile station or the PDSN (for example, a receiving party) rejects the 'Configure Request' of code number '1' in the LCP negotiation procedure.

The ID information is information about relevant protocol data as well as the code information represents serial numbers of data. That is, the number '1' of the 'Conf_Req (1)' and the number '2' of the 'Conf_Req (2) are serial numbers of data. 'Length' represents the length of data, and option information following the 'Length' information includes 'Type' representing a type for 'Configure Request', 'Length' representing a length of data corresponding to the option information, and data for 'Configure Request'.

First, the meaning of numbers of the Type information is shown in below Table 2.

TABLE 2

| Type number | Data of LCP frame according to Types |
| --- | --- |
| 0 | Reserved |
| 1 | MRU (Maximum Receive Unit), default: 1500 byte |
| 2 | ACCM (Asynchronous Control Character Map) |
| 3 | Authentication Protocol (PAP/CHAP, etc.) |
| 4 | Quality Protocol |
| 5 | Magic Number |
| 6 | Protocol Field Compression |
| 7 | Address and Control Field Compression |
| 8 | Call-back |
| 0D | Reserved |

That is, type number '1' represents information including information about a maximum size by which actual VOD data can be received. Basically, VOD data of 1500 bytes can be received. Type number '3' represents information about a protocol (PAP or CHAP) to be used for authentication. Type number '4' represents information about periodically lost packets and the number of transmitted octets. Type number '5' is a number which is randomly selected to distinguish states in which an error has occurred for PDSNs or mobile stations. That is, type number '5' represents information about a server or a mobile station. Type number '7' represents information about whether or not a compressed PPP field can be received. Type number '8' represents information about whether or not a VOD data frame can be received without an address and a control field. Finally, type number '0D' represents information notifying a relevant server that the mobile station wants to end a connection after authentication is performed so that it may be used in another application.

Meanwhile, length information represents information about a length of data in LCP option information. That is, as shown in FIG. 8, the length information in first LCP option information includes type information of 2 bytes and data information of 4 bytes and thus includes total 6 bytes, thereby being represented as '06'. The length information of each LCP option information following the first LCP option information includes only type information of 2 bytes, thereby being represented as '02'. While three LCP option information are shown as examples in FIG. 8, it should be understood that the number of LCP option information can be changed.

Data following the length information represents data according to a relevant type.

Meanwhile, the PDSN, which has received the 'Conf_Req (1)' having the LCP frame of the above-mentioned structure, transmits 'Conf_Ack (Code number: 2)' informing that the 'Conf_Req (1)' has been normally received to the mobile station in step 612. In contrast, when the 'Conf_Req (1)' is not normally received in the PDSN, the PDSN transmits 'Conf_Nak (Code number: 3)' to the mobile station.

The mobile station having transmitted the 'Conf_Req (1)' proceeds to step 613, in which the mobile station transmits 'Conf_Req (2)' when there is another request data in the LCP negotiation procedure. In this case, when the PDSN has normally received data, the PDSN proceeds to step 614, in which the PDSN transmits 'Conf_Ack' to the mobile station. In contrast, when data is not normally received in the PDSN, the PDSN transmits 'Conf_Nak', thereby ordering that the LCP negotiation request data be retransmitted.

However, in the case in which the PDSN transmits 'Conf_Rej (Code number: 4)' to the mobile station in response to the 'Conf_Req (1)' in step 615, the mobile station having received the 'Conf_Rej (Code number: 4)' changes the LCP option information and then transmits LCP negotiation request data including the changed LCP option information.

When the mobile station receives the 'Conf_Ack' in step 614, the mobile station ends the LCP negotiation procedure.

While the case in which the mobile station transmits the 'Conf_Req (1)' to the PDSN in step 611 has been described above, it can be understood that the PDSN can transmit LCP negotiation request data to the mobile station.

When the LCP negotiation procedure ends after the mobile station receives the 'Conf_Ack' in step 614, the mobile station proceeds to step 616, in which the mobile station requests authentication to the PDSN.

That is, the mobile station transmits 'Authenticate_Req' to the PDSN to request authentication. The PDSN having received the request of authentication transmits 'Authenticate_Ack' to the mobile station in response to the request of authentication in step 617.

Thereafter, when the mobile station receives the 'Authenticate_Ack', the mobile station ends the authentication procedure and then performs an IPCP negotiation procedure.

The mobile station having received the 'Authenticate_Ack' transmits 'IPCP_Req (1)' for IPCP negotiation to the PDSN in step 618. That is, the mobile station requests an IP and a Domain Name System (DNS) address, and the PDSN assigns an IP and a DNS address to the mobile station in response to the request of the mobile station. Herein, number '1' of the 'IPCP_Req (1)' is ID information representing a serial number of transmission data.

Then, the PDSN transmits 'IPCP_Ack (Code number: 2)' to the mobile station in response to the 'IPCP_Req (1)' in step 619. Also, in step 623, when 'IPCP_Ack (code number: 3)' is transmitted from the PDSN to the mobile station in response to step 621 to be described later, the PPP negotiation procedure ends. In contrast, 'IPCP_Req' is not normally received in the PDSN, the PDSN transmits 'IPCP_Nak (Code number: 3)' to the mobile station.

However, in the case in which the PDSN transmits 'Conf_Rej (Code number: 4)' to the mobile station in step 620, the mobile station receives the 'Conf_Rej (Code number: 4)', changes the IPCP option information and then transmits IPCP negotiation request data including the changed IPCP option information. Such steps are identically applied to 'IPCP_Req (2)' and 'IPCP_Req (3)' transmitted in steps 621 and 622.

Thereafter, when other IPCP negotiation request data exist, the mobile station transmits the 'IPCP_Req (2)' and 'IPCP_Req (3)' through steps 621 and 622, respectively, according to the amount of request data.

Figure 9:
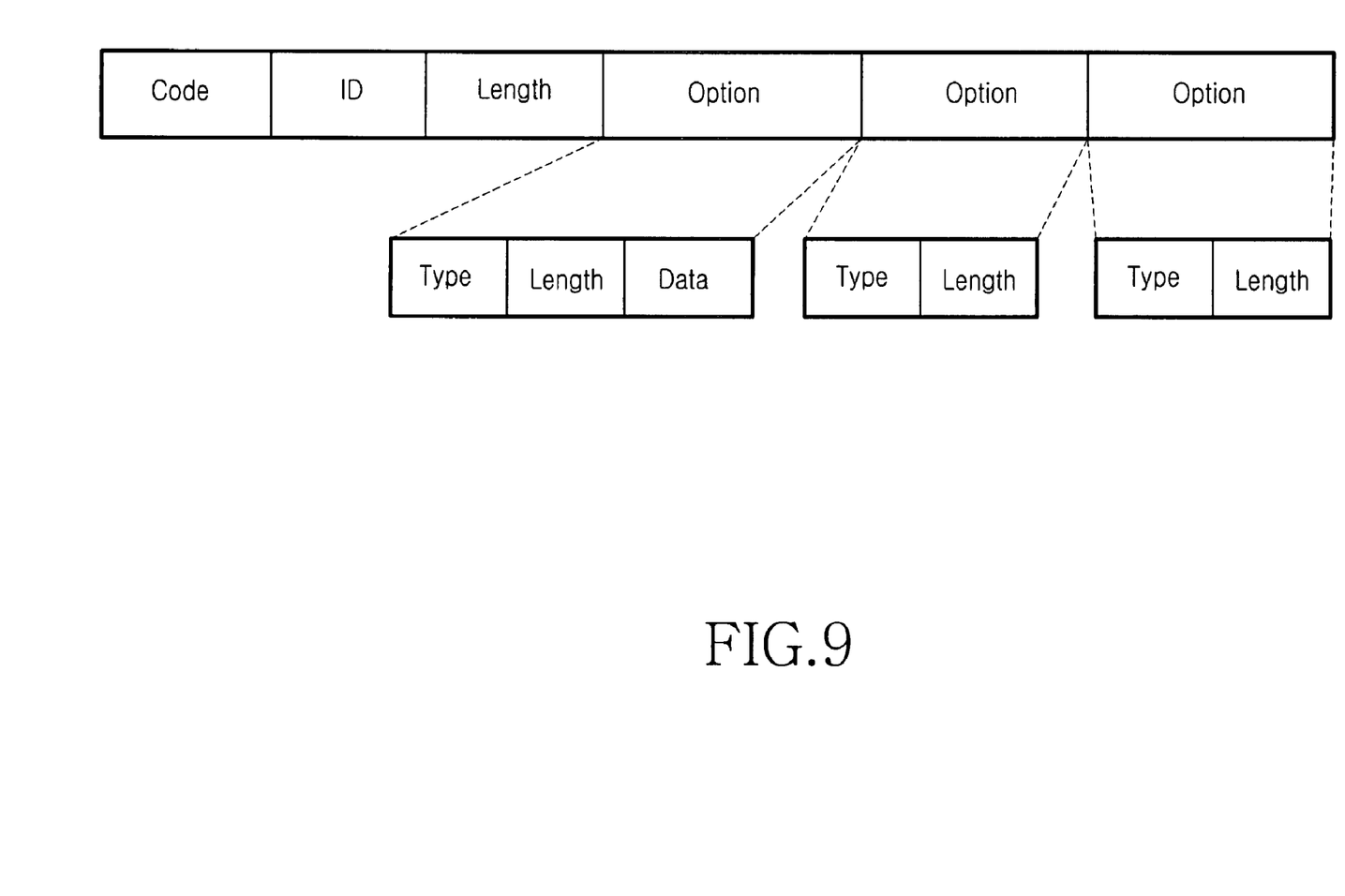
FIG. 9 is a view representing a detailed construction of an IPCP frame used in an IPCP negotiation procedure shown in FIG. 6.

Since such an IPCP frame includes a protocol field and an IPCP data field as shown in FIG. 7, the IPCP data field may be subdivided as shown in FIG. 9. As shown in FIGS. 8 and 9, the LCP frame and the IPCP frame have an identical structure with each other. Hereinafter, from among the IPCP frame, only code information and type information which are different from those of the LCP frame will be described, but the description of the remaining fields will be omitted.

The code information of the IPCP frame is shown in Table 3.

TABLE 3

| Code number | Data of IPCP frame according to Code |
|---|---|
| 1 | Request |
| 2 | Ack |
| 3 | Nak |
| 4 | Reject |

Code number '1' indicates data transmitted from the mobile station to the PDSN or vice versa in an IPCP negotiation procedure of an IPCP negotiation procedure, and means a signal requesting LCP negotiation. The code number '1' is a code number included in each of 'IPCP_Req (1)', 'IPCP_Req (2)', and 'IPCP_Req (3) signals shown in FIG. 6.

Code number '2' represents a signal for notifying that the mobile station or the PDSN (for example, a receiving party) normally receives data transmitted from the PDSN or the mobile station (for example, a transmitting party) in the IPCP negotiation procedure and acknowledges the received data. The code number '2' is a code number which is included in a 'IPCP_Ack' signal shown in FIG. 6.

Code number '3' represents a signal of ordering that transmitting party again requests the IPCP negotiation either when the receiving party does not normally receive data transmitted from the transmitting party or when the receiving party rejects the 'Configure Request' of code number '1' in the IPCP negotiation procedure. The code number '3' is a code number which is opposite to code number '2'.

Code number '4' represents a signal for informing the mobile station or the PDSN (for example, a receiving party) rejects the 'Configure Request' in the IPCP negotiation procedure.

In addition to the above-mentioned code information, there are a variety of different type information between the IPCP frame and the LCP frame as represented in Table 4.

TABLE 4

| Type number | Data of IPCP frame according to Type |
|---|---|
| 2 | IP-Compression-Protocol (selection of compression scheme) |
| 3 | IP-Address (IP address to be assigned) |
| 81 | Primary-DNS_Address (IP address to be assigned) |
| 83 | Secondary-DNS-Address |

Referring back to FIG. 5, after the MSM 10 performs PPP negotiation through the above-mentioned procedures, the MSM 10 transmits PPP-negotiated PPP option information to the multimedia processor 31 in step 513. Then, the multimedia processor 31 uses the received PPP option information as PPP information which configures the lowest layer of the protocol stack for the multimedia processor 31.

Thereafter, the VOD data is processed only up to the RLP layer in the MSM 10 and a data route is set to transmit the VOD data to the multimedia processor 31. That is, the MSM 10 processes the VOD data only up to the RLP layer in step 514, and then transmits the VOD data to the multimedia processor 31.

Then, the multimedia processor 31 processes the received VOD data by decapsulating the received VOD data from the PPP layer to the RTP/RTCP/RTSP/HTTP layer which is the highest layer in step 515.

Thereafter, when the multimedia processor 31 notifies the MSM 10 of the end of the VOD service in step 516, the set data route of the multimedia processor 31 is released, a route for processing normal data in the MSM 10 is set, and the VOD service ends.

Referring to Table 5 below are data rates obtained by the VOD data processing method according to an embodiment of the present invention, it can be understood that VOD data can be rapidly processed in upload and download. Table 5 shows data obtained in consideration of even a load which is storing transmission and reception VOD data into a file system, and the values of the data may be varied depending on test conditions. Also, the respective comparative values represent average values obtained after an actual service is tested several times, and maximum values obtained through the tests are also expressed in parentheses.

TABLE 5

| | Mobile station according to embodiments of the present invention | Mobile station according to the prior art |
|---|---|---|
| Download (1X-EVDO) | 800 kbps (1 Mbps Max.) | 230 kbps (270 kbps Max.) |
| Upload (1X-EVDO) | 100 kbps (120 kbps Max.) | 50 kbps (60 kbps Max.) |

Therefore, the VOD data processing method of the mobile station according to an embodiment of the present invention uses PPP option information, which is negotiated when the mobile station is connected to a WAP-based Internet, as PPP information of the PPP layer for the multimedia processor. As a result, the MSM processes received VOD data only up to RLP layer to maximally assure the processing speed of the received VOD data and transmits the processed VOD data to the multimedia processor, and the multimedia processor processes the VOD data from the PPP layer to the highest layer, thereby improving the VOD data processing speed in the mobile station.

As described above, the MSM and the multimedia processor according to embodiments of the present invention have different protocol stack structures from those of the prior art, respectively. That is, according to the prior art, an MSM processes received VOD data up to the PPP layer using PPP option information negotiated by the MSM when a relevant mobile station is connected to the WAP-based Internet, and then a multimedia processor processes the VOD data from the IP layer to the highest layer. In contrast, according to an embodiment of the present invention, the MSM processes received VOD data up to the RLP layer and then the multimedia processor processes the received VOD data from the PPP layer to the highest layer. This is because an occupancy rate of lower layers in the protocol stack of the MSM is low and it is difficult to normally process data rising from a lower layer in the PPP layer.

As described above, according to an embodiment of the VOD data processing method of the mobile station of the present invention, the PPP layer is set to be the lowest layer of the protocol stack for the multimedia processor so that the MSM can process VOD data only up to the RLP layer, and the remaining protocol layers of the VOD data can be processed in the multimedia processor, thereby improving a VOD data processing speed when VOD service is provided.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for processing Video On Demand (VOD) data in a mobile station including a multimedia processor for processing multimedia data and an Mobile Station Modem (MSM) for controlling the mobile station, the method comprising the steps of:

negotiating Point to Point Protocol (PPP) option information by performing negotiation for communicating with a server when the mobile station accesses to a Wireless Application Protocol (WAP) through the MSM;

transmitting the PPP option information negotiated through the MSM to the multimedia processor;

setting a VOD data route by using the transmitted PPP option information as PPP information of the multimedia processor;

processing VOD data, which are received in the MSM according to the VOD data route, to a layer not exceeding an RLP layer of the VOD data, and then transmitting the VOD data from a data processor to the multimedia processor in response to processing the VOD data at the RLP layer; and processing the VOD data, which are transmitted to the multimedia processor, from a PPP layer which is a lowest layer in the multimedia processor.

2. The method as claimed in claim 1, wherein the PPP option information is transmitted to the multimedia processor, when a signal representing that VOD service is available is transmitted in response to a signal of the MSM representing a start of the VOD service.

3. A mobile station comprising:

a radio frequency unit for performing the transmission and reception functions of the mobile station;

a data processor comprising a transmitter for encoding and modulating the signal to be transmitted and a receiver for demodulating and decoding the received signal;

an audio processor for reproducing a received audio signal output from the data processor and for transferring a transmission audio signal, which is output from a microphone, to the data processor;

a keypad comprising keys for inputting number and character information and function keys for setting various functions;

a memory comprising a program memory and a data memory; and a multimedia processor for processing video on demand data received through a wireless network according to a VOD data route to a layer not exceeding an RLP layer of the VOD data at the data processor and then transmitting the VOD data from the data processor to the multimedia processor in response to processing the VOD data at the RLP layer, wherein the multimedia processor receives point to point protocol option information as negotiated by a mobile station modem while the wireless application protocol access is performed, and then uses the received point to point protocol option information as point to point protocol information of the multimedia processor.

4. The mobile station of claim 3, wherein the multimedia processor while using the point to point protocol option information as point to point protocol information of the multimedia processor, forms upper layers for processing video on demand data, which are processed by an Radio Link Protocol of the mobile station modem, and processes the video on demand data through a decapsulation process of the video on demand data according to each layer.

5. A multimedia processor in electrical communication with a data processor having a Radio Link Protocol (RLP) layer for use in a mobile station to process VOD data received from the data processor through a wireless network while VOD service is executed in response to the data processor processing the VOD data to a layer not exceeding the RLP layer, the multimedia processor being programmable to receive Point to Point Protocol (PPP) option information that is negotiated by a Mobile Station Modem (MSM) while a Wireless Application Protocol (WAP) access is performed for the mobile station, to use the received PPP option information as PPP information for the multimedia processor, to form upper layers comprising PPP, IP, TCP/UDP, Socket, and RTP/RTCP/RTSP/HTTP layers for processing VOD data, and to process the VOD data via decapsulation the VOD data according to each layer.

6. A multimedia processor as claimed in claim 5, wherein the multimedia processor is further programmable to encapsulate transmission data corresponding to the VOD data received from the MSM from the highest protocol layer to the lowest protocol layer to transmit the transmission data to the MSM.

7. A multimedia processor as claimed in claim 5, wherein the multimedia processor is operable using a protocol stack comprising the PPP layer as its lowest layer, and an IP layer, a TCP/UDP layer, a Socket layer, and an RTP/RTCP/RTSP/HTTP layer sequentially-stacked on the PPP layer.

8. A multimedia processor as claimed in claim 7, wherein an MSM is operable using a protocol stack comprising a physical layer as its lowest layer, and then a Radio Link Protocol (RLP) layer, a Point to Point Protocol (PPP) layer, an Internet Protocol (IP) layer, a Transmission control Protocol/User Datagram Protocol (TCP/UDP) layer, a Socket layer, and a Wireless Application Protocol (WAP) layer as its highest layer, the MSM decapsulating received data according to each layer and transmitting the received data to an application program through the WAP layer, the MSM being configured to transmit the PPP option information of the PPP layer to allow the multimedia processor to receive the option information of the PPP layer and use the received option information as the PPP information of the multimedia processor, and thereby allow VOD data received through the MSM to be processed only up to the RLP layer by the MSM and VOD data from the PPP layer to the highest layer to be processed by the multimedia processor.

9. A Mobile Station Modem (MSM) for use in a mobile station to process VOD data, the MSM being configured to control the mobile station when VOD server access is requested by a user by transmitting a PPP option information set and information about upper protocols selected from the group consisting of IP, TCP/UDP, and Socket protocols, the MSM being operable to transmit to a multimedia processor the PPP option information set by performing PPP negotiation while WAP access is performed, so that it can be used as PPP information of the multimedia processor, the MSM forming information about upper protocols through the WAP access to the multimedia processor connected thereto, and the MSM being operable to transmit, to the multimedia processor, the VOD data which are processed to a layer not exceeding an RLP layer of the VOD data according to a VOD data route which is set after transmitting the PPP option information to the multimedia processor.

10. An MSM as claimed in claim 9, wherein the MSM is configured to receive transmission data output from the multimedia processor according to VOD data received at the multimedia processor, and to transmit the received transmission data to a VOD server.

* * * * *